United States Patent [19]

Wehler

[11] 4,347,754

[45] Sep. 7, 1982

[54] FORCE AMPLIFIER

[75] Inventor: Herbert Wehler, Neunkirchen-Salchendorf, Fed. Rep. of Germany

[73] Assignee: Optima Spanntechnik GmbH, Siegen, Fed. Rep. of Germany

[21] Appl. No.: 132,989

[22] Filed: Mar. 24, 1980

[30] Foreign Application Priority Data

Apr. 4, 1979 [DE] Fed. Rep. of Germany ....... 2913506

[51] Int. Cl.³ .................... F16H 21/44; F16H 25/18
[52] U.S. Cl. ..................................... 74/110; 74/520; 269/32
[58] Field of Search ..................... 74/110, 520; 269/32

[56] References Cited

U.S. PATENT DOCUMENTS

| 925,673 | 6/1909 | Zook | 74/520 |
|---|---|---|---|
| 2,443,775 | 6/1948 | Olson | 269/32 |
| 2,829,500 | 4/1958 | Butler | 74/110 |
| 3,200,597 | 8/1965 | Stotz | 74/520 |
| 3,579,742 | 5/1971 | Muttart | 74/520 |
| 4,073,197 | 2/1978 | Arnold et al. | 74/110 |

FOREIGN PATENT DOCUMENTS

| 1096459 | 12/1967 | United Kingdom | 74/520 |
|---|---|---|---|
| 1435448 | 5/1976 | United Kingdom | 74/520 |

OTHER PUBLICATIONS

"Linear Motion Elements", Product Engineering, Jan. 1938, p. 29.

Primary Examiner—Lawrence J. Staab
Attorney, Agent, or Firm—Toren, McGeady & Stanger

[57] ABSTRACT

In a force amplifier, supporting members extend between a pressure plate and a countersupport plate. At each plate the supporting members bear against end bolts and intermediate the plates the support members bear against joint bolts. A spreader bolt extends through the countersupport plate and has a spreader head located between the joint bolts. The surfaces of the spreader bolt contacting the joint bolts are concavely shaped.

5 Claims, 3 Drawing Figures

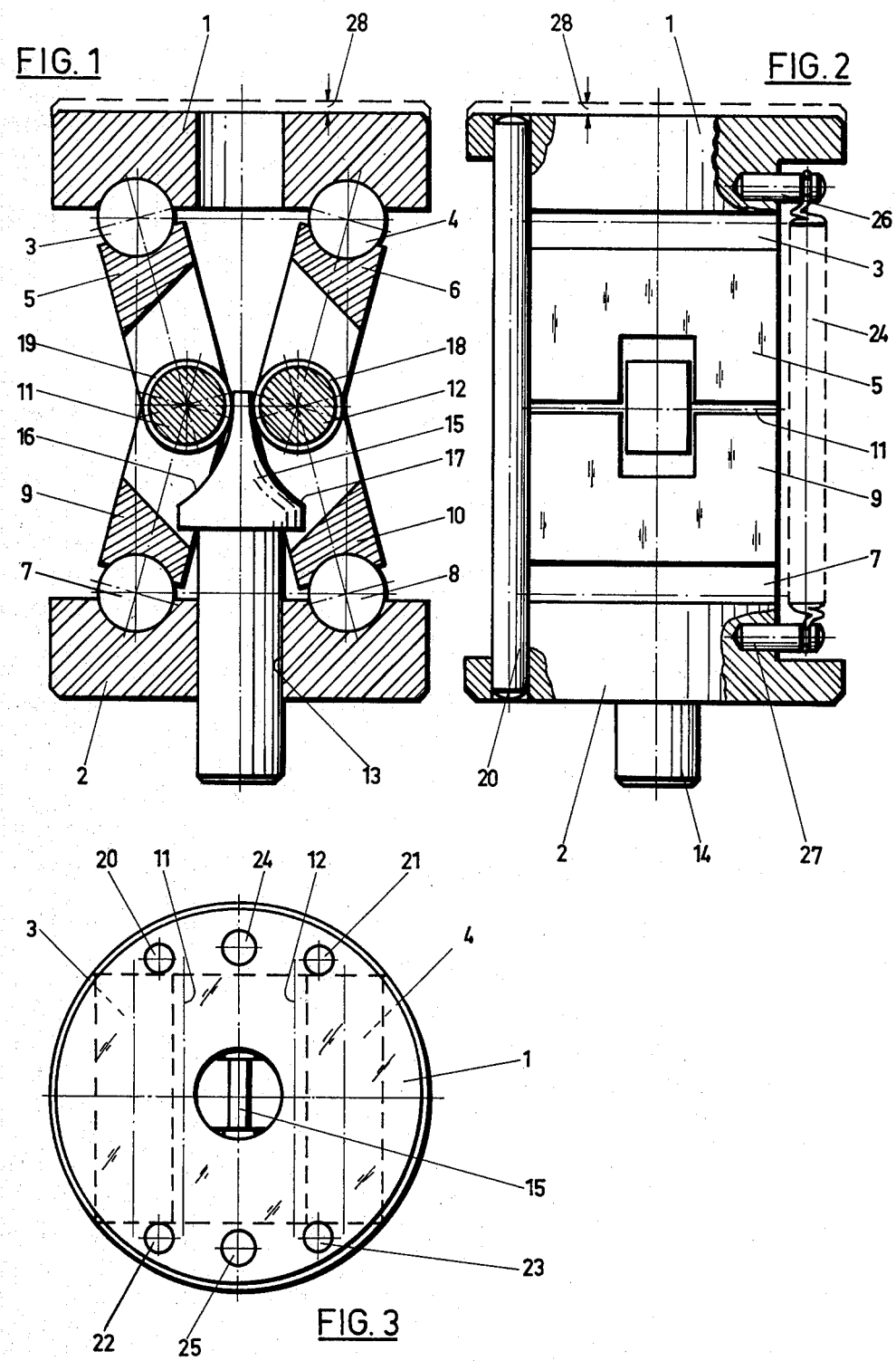

FORCE AMPLIFIER

The invention relates to a force amplifier with a pressure plate and a spreader bolt axially movably supported in a countersupport plate, and with supporting members which are arranged between the pressure plate and the countersupport plate and which bear against one another and are inclined relative to one another.

From West German Pat. No. 2,135,810, a quick-acting gripping device is known which is provided with a cylindrical housing having an external thread and a driving member which is rotatable in the housing about an axis which is coaxial to the axis of the housing, the driving member protruding axially from the housing and being connected to the housing so that they are non-rotatable relative to each other to a limited extent. For transmitting the gripping forces, the driving member has a surface which extends perpendicularly relative to the housing axis. At the end of the driving member which is inside the housing, one end of a pressure lever is eccentrically supported, the other end of the pressure lever being eccentrically supported in a part of the gripping device which is movable axially relative to the driving member. In this case, the pressure lever assumes an inclined position relative to the housing axis in the state of no-load, and, in the state of stress, it assumes a stretched position parallel to the housing axis. A driving member rotatably supported centrally in the lower portion of the housing is polygonal at its end protruding from the housing and, with its adjacent portion, is supported in a slide bearing of a holding device of the quick-action gripping device. The part of the driving member which projects into the interior of the housing has a recess into which there projects a pressure lever consisting of two parts and which bears, with the hemispherical end of one part, against a concave member which is arranged in the recess eccentrically relative to the axis of rotation of the driving member. With its other end which is also hemispherical, the pressure lever bears against a concave member which is also arranged eccentrically relative to the axis of rotation of the driving member in the bottom of an oppositely located bearing part. By turning the polygonal end, a torque is transmitted to the housing. After releasing a locking device between the driving member and the housing, the driving member is rotated by 180° relative to the bearing part, so that the pressure lever is transferred from its originally oblique position into an axis-parallel position which causes the gripping effect.

Moreover, a force amplifier operating according to the toggle lever principle is known. It consists essentially of a pressure plate and a countersupport plate arranged opposite the pressure plate. A spreader bolt in the shape of a truncated cone is axially movably guided in the countersupport plate. In addition, supporting members are arranged between the pressure plate and the countersupport plate, wherein the supporting members facing the pressure plate are supported in grooves of the pressure plate and bear against the supporting members which face the countersupport plate. The supporting member which interacts with the countersupport plate also bears against the spreader bolt and can be pressed outwardly by the spreader bolt by a more or less great distance in dependence upon its position of engagement, thus creating the force amplification.

The supporting members roll on appropriately shaped tracks in the pressure plate and the countersupport plate. By pressing in the spreader bolt, the supporting member bearing against the spreader bolt is pressed outwardly, the other supporting member rolls on the supporting member bearing against the spreader bolt, and the two supporting members roll, with their two ends facing the pressure plate and the countersupport plate, respectively, in the grooves provided in the two plates. As a result of the toggle lever transmission, a long path of the spreader bolt leads to a short path of the pressure plate, or a low operating force leads to a high effective force caused by the pressure plate. However, this known force amplifier has the disadvantage that the rolling movement of the supporting members in the grooves of the pressure plate and the countersupport plate leads to a Hertzian compression which naturally results in a low stiffness.

Therefore, the invention is based on the task of providing a force amplifier in which no Hertzian compression is created and, thus, also the stiffness of the force amplifier is not negatively influenced.

In accordance with the invention, this task is solved in that, in a force amplifier of the type mentioned in the introduction, end bolts extending transversely of the longitudinal direction of the force amplifier are supported between the ends of the supporting members facing away from one another and the pressure plate and the countersupport plate, and joint bolts are supported at the ends of the supporting members facing one another, the supporting members bearing against the joint bolts.

The distance between the end bolts can be greater than the distance between the joint bolts. The joint bolts are arranged at the same level as closely as possible next to each other, while the distance between the end bolts is relatively great. This means that the supporting members are inclined relative to one another and that, by moving the joint bolts outwardly, the distance between the two end bolts assigned to the pressure plate and the countersupport plate becomes greater, so that the pressure plate travels a certain distance.

The spreader bolt can have two oppositely located spreader surfaces which face the joint bolts. Advantageously, the spreader bolt has a spreader head with spreader surfaces. The spreader surfaces of the spreader bolt can be curved exponentially. In this connection, it is advisable to curve the spreader surfaces of the spreader bolt in such a way that the ratio of the travel distance of the pressure plate to the distance of pressing in the spreader bolt is constant.

If the joint bolts were to move outwardly with a constant speed, the travel of the pressure plate would be in accordance with a cosine function, because the joint bolt would move on an arc of a circle with a constant peripheral speed. This is eliminated with the curved spreader surfaces by providing the spreader bolt with a special concave curvature, so that the travel of the pressure plate is constant as a function of the distance of pressing in of the spreader bolt. As a result, the force amplifier has a linear characteristic. Accordingly, the travel of the pressure plate is a movement which is proportional to the movement of the spreader bolt.

The linear characteristic of the force amplifier also relates to its stiffness. The curve is corrected in accordance with the angle between the supporting members in dependence on the function of force with respect to the function of distance: due to the angle of inclination of the supporting members and the change of the point where the force acts on the spreader bolt, the function of force, which is equal to the operating force acting on the spreader bolt, cannot be linear as a function of the gripping force, although this is expressed by the function of distance.

The reason for this is that the force components change in dependence on the angle of inclination of the supporting members and the ideal force build-up in the direction of the gripping force is reached only in the stretched state of the supporting members. This would mean that the spreading force decreases to zero. However, the stretched state may not be reached, since, otherwise, the force amplifier does not return into its initial position because of frictional forces. Accordingly, under load, a force component acts on the spreader bolt in the longitudinal direction of the spreader bolt; this force component becomes greater, the deeper the spreader bolt is pressed in. This force component acts on the operating spindle which is required for pressing in the spreader bolt and, thus, influences the stiffness of the force amplifier.

The linear characteristic of the force amplifier is particularly important when mounting spindles in faceplates since, in this case, always two spindles are arranged so that they face each other; the two spindles would jam if they do not rotate synchronously. The mounting of the force amplifier in a spindle is particularly simple. Only a mininum length is required, all the other parameters are variable.

In the region of the spreader surfaces of the spreader bolt, the bolts may have a collar in order to keep the contact pressure as low as possible. In addition, between the pressure plate and the countersupport plate, connecting bolts can be supported axially movably in the two plates. These bolts prevent the supporting members and the end bolts from falling out in the no-load state of the force amplifier. Moreover, it is advisable to arrange tension springs between the pressure plate and the countersupport plate which hold the force amplifier together in the no-load state and always return it into its initial position.

It is possible to build the force amplifier in a series of 40, 60, 100, 160, 250, 400 kN. The operating element or the bushing with the built-in screw for actuating the spreader bolt, can also be built in a series.

In the following, the invention shall be explained in more detail with the aid of an embodiment which is illustrated in the drawing.

In the drawing:

FIG. 1 is a longitudinal section taken through a force amplifier,

FIG. 2 is a side view of FIG. 1, and

FIG. 3 is a top view of FIG. 1.

Supporting members are arranged in the manner of a toggle lever between a pressure plate 1 and a countersupport plate 2. End bolts 3 and 4 extending transversely of the longitudinal direction of the force amplifier are embedded almost to their median planes in the pressure plate 1. Supporting members 5 and 6 bear against the end bolts 3 and 4. In the same manner, end bolts 7 and 8 extending transversely of the longitudinal direction of the force amplifier are embedded almost to their median planes in the countersupport plate 2. Supporting members 9 and 10 bear against these end bolts 7 and 8. The supporting members 9 and 10 and the supporting members 5 and 6 engage over the end bolts 3,4,7 and 8 almost up to their median planes. This ensures a secure seat of the end bolts 3,4,7 and 8 in the pressure plate 1 and the countersupport plate 2, respectively, and the same secure seat of the supporting members 5,6,9 and 10 on the end bolts 3,4,7 and 8.

Joint bolts 11 and 12 extend approximately in the middle between the pressure plate 1 and the countersupport plate 2; the upper supporting members 5 and 6 bear against these joint bolts 11 and 12 from the top and the lower supporting members 9 and 10 from below, wherein they embrace the joint bolts 11 and 12 almost up to their median planes, so that a secure support is ensured also at this location.

A spreader bolt 14 is axially movably supported in a bore 13 of the countersupport plate. At its upper end, the spreader bolt 14 has a spreader head 15 with concavely curved spreader surfaces 16 and 17. The spreader surfaces 16 and 17 are curved exponentially in such a way that the ratio of the travel distance 28 of the pressure plate 1 to the distance of pressing the spreader bolt 14 is constant. The joint bolts 11 and 12 each have a collar 18 or 19 in the middle in order to keep the contact pressure as low as possible.

Four bolts 20,21,22 and 23 extend between the pressure plate 1 and the countersupport plate 2; these four bolts prevent the joint bolts 11 and 12 and the supporting members 5,6, 9 and 10 from falling out. In addition, tension springs 24 and 25 are arranged between the pressure plate 1 and the countersupport plate 2 in order to keep the force amplifier together in the no-load state and to return the force amplifier into the initial position when the load is removed. The tension springs 24 are stretched between the bolt 26 of the pressure plate 1 and the bolt 27 of the countersupport plate 2.

I claim:

1. Force amplifier with a pressure plate and a countersupport plate in spaced apart relation, a spreader bolt axially movably supported in said countersupport plate and extending toward said pressure plate, supporting members arranged between said pressure plate and said countersupport plate, said supporting members are inclined relative to one another, end bolts 3, 4, 7, 8 extending transversely of the longitudinal direction of the force amplifier between said pressure plate and countersupport plate are supported between the ends of said supporting members 5, 6, 9, 10 facing away from one another and said pressure plate 1 and said countersupport plate 2, joints bolts 11, 12 are supported on the ends of said supporting members 5, 6, 9, 10 which face one another with said supporting members 5, 6, 9, 10 bearing against said joint bolts 11, 12, wherein said spreader bolt has a pair of oppositely facing spreader surfaces thereon located between said pressure plate and countersupport plate with each said spreader surface in contact with a different one of said joint bolts, said spreader surfaces in contact with said joint bolts are concavely shaped, and said concavely shaped spreader surfaces are curved exponentially so that the ratio of the travel distance 28 of said pressure plate 1 to the distance of pressing in said spreader bolt 14 is constant.

2. Force amplifier according to claim 1, characterized in that said spreader bolt 14 has a spreader head 15 with said concavely shaped spreader surfaces 16, 17 formed on said spreader head.

3. Force amplifier according to claim 1, characterized in that, in the region where said concavely shaped spreader surfaces 16, 17 of said spreader bolt 14 contact said joint bolts, said joint bolts 11, 12 are provided with collars 18, 19.

4. Force amplifier according to claim 1, characterized in that connecting bolts 20, 21, 22, 23 are supported between said pressure plate 1 and said countersupport plate 2 so as to be axially movable in both said plates 1, 2.

5. Force amplifier according to claims 1 or 4, characterized in that tension springs 24, 25 are arranged between said pressure plate 1 and said countersupport plate 2.

* * * * *